June 2, 1925.

L. W. SANDERS 1,540,227

SCALE BALANCE, AUTOMATIC LIFT, TWO-WAY RIDING PLOW

Filed March 14, 1923   3 Sheets-Sheet 1

Lee. W. Sanders   INVENTOR.

June 2, 1925.  1,540,227
L. W. SANDERS
SCALE BALANCE, AUTOMATIC LIFT, TWO-WAY RIDING PLOW
Filed March 14, 1923   3 Sheets-Sheet 2

Lee. W. Sanders  INVENTOR.

June 2, 1925.
L. W. SANDERS
1,540,227
SCALE BALANCE, AUTOMATIC LIFT, TWO-WAY RIDING PLOW
Filed March 14, 1923   3 Sheets-Sheet 3
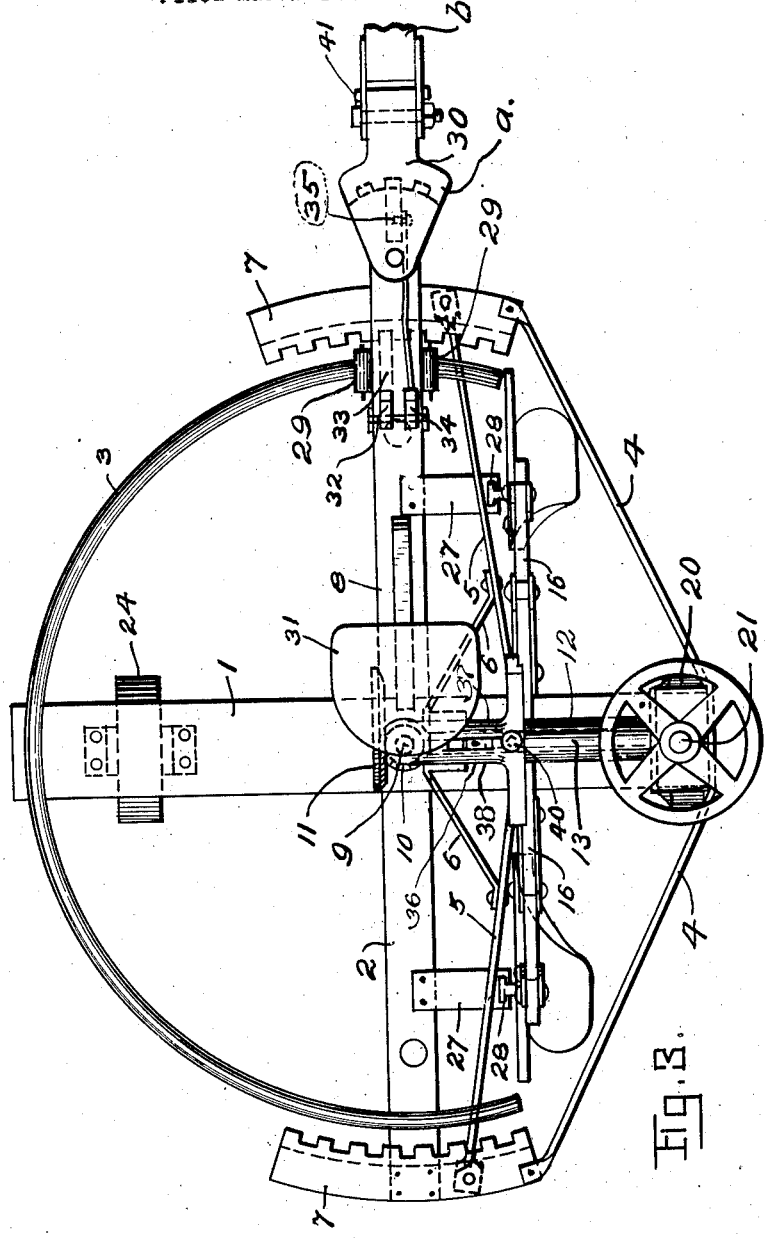
Lee. W. Sanders INVENTOR.

Patented June 2, 1925.

1,540,227

UNITED STATES PATENT OFFICE.

LEE W. SANDERS, OF BURLEY, IDAHO.

SCALE BALANCE, AUTOMATIC LIFT, TWO-WAY RIDING PLOW.

Application filed March 14, 1923. Serial No. 624,965.

*To all whom it may concern:*

Be it known that I, LEE W. SANDERS, a citizen of the United States, residing at Burley, in the county of Cassia and State of Idaho, have invented a new and useful Scale Balance, Automatic Lift, Two-Way Riding Plow, which is adapted to use either moldboard or disk-plowing units and to be constructed in either single-furrow or gang type, and of which the following is a specification of a single-furrow type.

The invention relates to improvements in two way or sidehill riding plows in which the plows are made to operate automatically by being lifted out or thrust into the ground by the operation and action of the team in swinging or reversing the direction of a pivot tongue in turning around at the end of the furrow and the objects of the improvements are, first, to eliminate hand levers and lessen the labor of the operator; second, to conserve horse-power by providing a plow which does not require to be dragged round at the end of the furrow and in which the team is relieved of all side draft and weight upon their necks; third, to enable the operator to plow continuously in one direction from any side of the field by throwing the dirt in one direction only and eliminate all dead furrows and the necessity of back filling and leveling; fourth, to increase the working capacity of the operator by decreasing his labor and adding to the speed in performing the operations necessary in his work.

Figure 1:
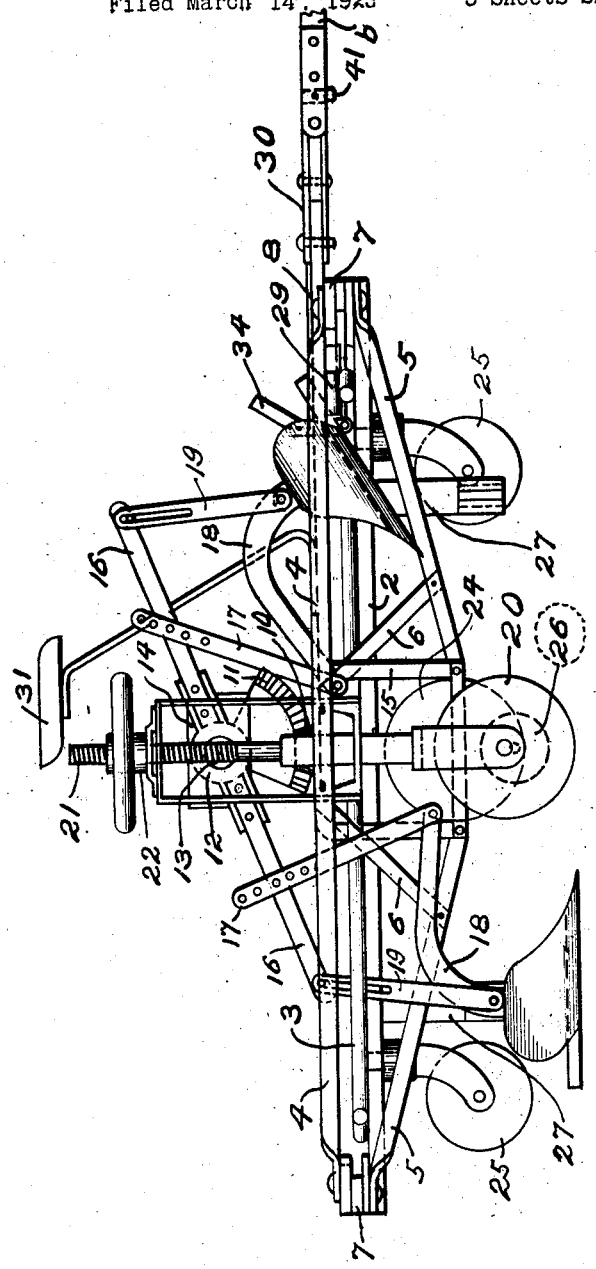
Figure 2:
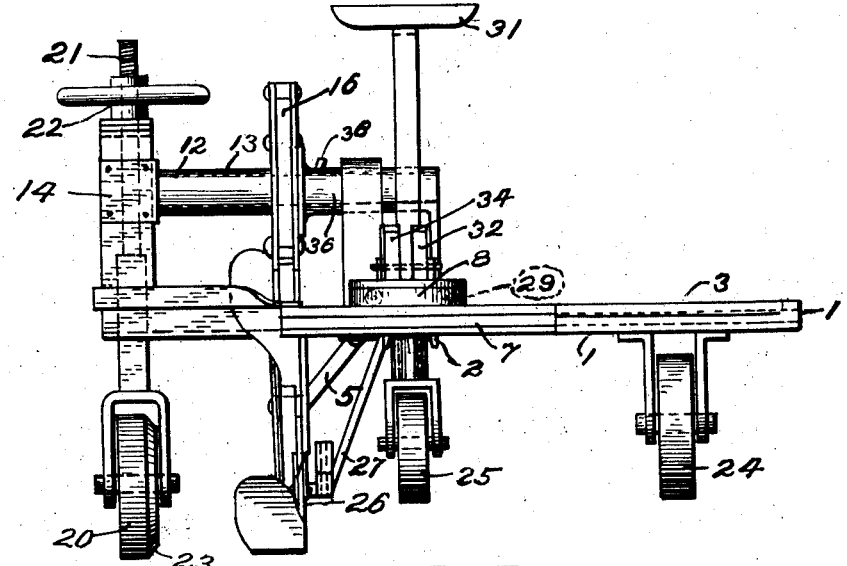
Figure 5:
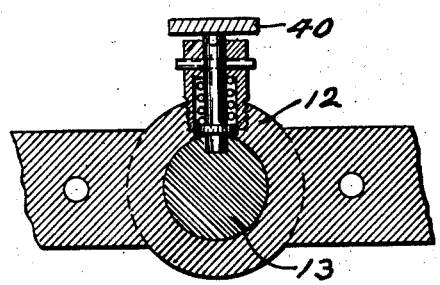
Figure 4:
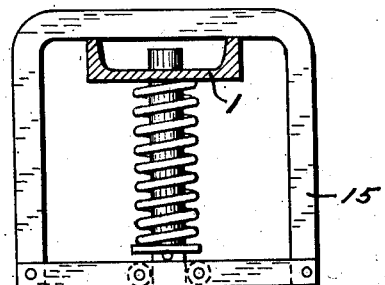

The form of the invention is illustrated in the accompanying drawings which form a part of this specification of which Fig. 1 is a view showing the furrow side of the entire machine, excepting the outer portion of the jointed tongue, showing one plow in the working position and the other plow in the neutral position; Fig. 2 is an end view of the entire machine showing plows in same position as in Fig. 1; Fig. 3 is a plan view of the entire machine, excepting the extended portion of the jointed tongue, showing the machine as viewed vertically from the top. Fig. 4 is a detail of cutter wheel as used on the machine and Fig. 5 is a detail of gear shift on machine.

The main frame unit 1 and the main frame unit 2 constitutes the foundation upon and around which the machine is constructed. The pivot tongue track 3 constitutes the brace for the land side of the machine and furnishes the support for the pivot tongue when the direction of the same is reversed in turning at the end of the furrow. The foregoing, together with furrow side brace 4, the gauge track brace 5 and the standard braces 6 constitute the main frame of the machine. The hitch bars 7, one at either end of the machine, securely attached to the respective ends of main frame unit 2, constitute the medium through which the width of the furrow is regulated. The pivot tongue 8 is the medium through which the automatic action of the plow is attained, said pivot tongue having an opening at its rear end through which is inserted a king bolt 9 which king bolt constitutes the shaft upon which the pivot tongue revolves in turning the team at the end of the furrow. The king bolt 9, with attached mechanism also constitutes the land side standard which furnishes support for one end of the mechanical units through which the automatic action of the plow is attained.

Attached to pivot tongue 8 and revolving with said tongue around the king bolt 9 is a bevel gear wheel 10 which meshes in a bevel gear segment 11, which segment is attached to the lift shaft 12, the said system of gears imparting to the said lift shaft a rotating motion as the point of the pivot tongue 8 is swung or rotated over pivot tongue track 3 from one hitch bar 7 to the other. The lift shaft 12 is a hollow shaft rotating upon a stationary shaft 13 which shaft extends from the top of land side standard 9 to the top of furrow side standard 14, being securely fastened in said position.

Braced to the main frame unit 1 and extending vertically upward and downward from said unit and upon either side of the same is a gauge track 15, said gauge track being further braced in position by gauge track braces 5 and standard braces 6.

Attached to lift shaft 12 and extending outwardly each way at right angles to said lift shaft is a balance arm 16 which moves in an arc in unison with the movement of pivot tongue 8 upon pivot tongue track 3, said movement being occasioned by the system of gears heretofore described.

Connected with balance arm 16 at a point between its connection with lift shaft 12 and the ends of said balance arm are gauge bars 17, said gauge bars having an adjustable connection with said balance arm permitting said gauge bars to move vertically across said balance arm and control the depth of the furrow to be made by the plow, the desired depth of furrow being attained by adjusting gauge bars 17 upon balance arm 16 to elevate or depress the front ends of plow beams 18 to secure desired depth of furrow.

Gauge bars 17 are connected with front ends of plow beams 18 which beams are attached at their front ends to gauge tracks 15 by means of a clevis with a roller on the pin which permits the end of the plow beam to travel upward and downward on said track as actuated by the lift and thrust of gauge bars 17 as imparted by balance arm 16 through the rotation of lift shaft 12, said upward and downward movement of the ends of said plow beams regulating the depth of the furrow to be cut.

Attached to either ends of balance arm 16 are lift bars 19 which lift bars are attached at their opposite ends to the rear ends of plow beams 18, the function of said lift bars being to elevate the plow units out of the ground when same are not being used. Lift bars 19 have a slot at their attachment with balance arm 16 by means of which the said balance arm is allowed to move freely while plows are attaining their working position.

The machine is mounted upon four wheels, all of which wheels run in a vertical position and only one of which runs in the furrow. The furrow wheel 20 is so attached to the end of main frame unit 1 as to permit of being raised and lowered from its position with said main frame unit by means of a screw shaft 21 and a flange nut 22. Furrow wheel 20 has a beveled surface upon its inner side which keeps it in position by preventing its climbing the wall of the furrow, said bevel surface being shown at 23.

Landside wheel 24 is attached to the end of main frame unit 1 opposite furrow wheel 20 and lead wheels 25 are pivoted, one on either end of main frame unit 2.

Attached to bottom of gauge track 15 is a cutter wheel 26 which cutter wheel is so connected with a coil spring as to allow it sufficient vertical movement to pass over solid substances when encountered. Detail of cutter wheel is shown in Fig. 4.

To prevent lateral motion in the plowing units when same are in operation a clamp 27 is bolted to main frame unit 2 and gauge track braces 5 at points opposite the rear ends of plow beams 18 into which clamps a stay bar 28 fits when plows are in working position. Stay bar is bolted to plow beams.

The pivot tongue 8 extends a sufficient distance over and beyond hitch bars 7 to permit the attachment of doubletrees or eveners and said tongue is made to travel easily over pivot tongue track 3 by means of rollers 29 which rollers are attached to and support the weight of said pivot tongue, eveners and part of jointed tongue 30 while team is turning at end of furrow.

Upon pivot tongue 8 is bolted operators seat 31 in such manner as to rotate with said pivot tongue as the direction of same is shifted from end to end of the machine in turning at end of furrow.

Directly in front of operator and attached to pivot tongue 8 is a foot lever 32 which operates dog 33 by means of which pivot tongue 8 is locked into position with hitch bars 7. Set in pivot tongue 8 beside foot lever 32 is foot lever 34 which operates the dog 35 by means of which the jointed tongue 30 is locked into working position.

The jointed tongue 30 is attached to pivot tongue 8 by means of a pin forming a hinge joint permitting jointed tongue 30 to swing in a horizontal plane and to be locked into working position by means of foot lever 34 and dog 35, such arrangement being necessary to keep jointed tongue 30 into a position parallel with the furrow regardless of the position the pivot tongue 8 occupies on the hitch bars 7.

The jointed tongue 30 is made in two sections, *a* and *b*, Fig. 3, which sections are joined by a pin forming a hinge joint permitting section *b* to swing in a vertical plane independent of section *a*, such arrangement eliminating unnecessary weight on the horses' necks and the vertical motion of said section *b* being restricted within proper bounds by means of a stirrup 41 bolted into position at the division joint of sections *a* and *b*.

In order to place plows in neutral position for the purpose of traveling from field to field the lift shaft 12 is divided at a point 36. On the sections of the said lift shaft 12 is cut a slot 37 which slot extends longitudinally in and along each section of said lift shaft and across the point of division point 36. Within said slot 37 is fitted a sliding key 38 which is adapted to be moved horizontally in and along said slot 37 and is capable of being disengaged from contact with one section of said lift shaft 12 by being slid back into the slot in the opposite section of the same. When sliding key 38 is pushed into position in said slot 37 as to be in contact with both sections of lift shaft 12 the said sliding key lying across division point 36 it causes the sections of said lift shaft to rotate together, thus placing the machine in gear.

To throw the machine out of gear the sliding key 38 is moved along the slot 37 until it becomes disengaged from the opposite section of the lift shaft 12.

To hold plows in neutral position a pin 40, actuated by a spring, is attached to that section of the lift shaft 12 which carries balance arm 16, which pin operates through a hole bored through one side of lift shaft 12 and into stationary shaft 13. Pin 40 is capable of being locked and held in a position allowing the free movement of lift shaft 12 upon stationary shaft 13.

To bring plowing units into neutral position disengage pivot tongue 8 from hitch bar 7 and rotate to a point half way between the two hitch bars at which point machine is to be thrown out of gear and locked into neutral position by releasing pin 40 and allowing same to fall in place in the hole piercing the side of lift shaft 12 and into stationary shaft 13, thus preventing the said shafts from rotating upon each other.

I am aware that prior to my invention two way plows and plows, the frame work of which do not require to be turned around at the end of the furrow have been made. I therefore do not claim these features exclusively, but

I claim—

1. In a plow of the class described the combination of a pivot tongue; a vertical king bolt on which the end of said tongue is pivoted; a bevel gear secured on the end of the tongue and carried on said king bolt; a segment gear with teeth meshing with the teeth of said bevel gear; a horizontal shaft on which said segment gear is journalled; a lift shaft in which said horizontal shaft is carried and to which said segment gear is secured; a balance arm secured on said lift shaft; and plows operatively connected with said balance arm.

2. A two way plow comprising a tongue adapted to be swung in a horizontal plane; a king bolt on which one end of said tongue is pivoted; a bevel gear on the end of said tongue and journalled on said king bolt; a segment gear in mesh with said bevel gear; a horizontal mounting for said segment gear; an arm secured on said segment gear and movable therewith; and a plow operatively connected on each end of said arm, whereby both of said plows will be moved vertically when the said tongue is moved horizontally on its pivot.

3. A two way plow comprising a tongue pivoted at one end for horizontal movement; a bevel gear secured on the pivoted end of said tongue; a segment gear in mesh with said bevel gear; an arm secured on said segment gear and tiltable therewith; a plow on each end of said arm and vertically movable therewith into or out of the soil when said tongue is swung on its pivot.

4. A two way plow comprising a tongue pivoted at its rear end for horizontal swinging; a balance arm horizontally journalled above the plane of the movement of said tongue; gears connecting said tongue and said balance arm whereby said arm is tilted in a vertical plane when the tongue is moved in a horizontal plane; a plow on each end of said balance arm and movable into or out of the soil as said tongue is swung by the team on the pivot of the tongue; and means for setting the plows to cut furrows of different widths.

LEE W. SANDERS.